US008601298B2

(12) United States Patent
Salsbery et al.

(10) Patent No.: US 8,601,298 B2
(45) Date of Patent: Dec. 3, 2013

(54) SYSTEM AND METHOD FOR DETERMINING OPTIMAL OPERATING PARAMETERS FOR CONSERVING POWER IN A PORTABLE DEVICE FROM A HYPERSURFACE WHICH REPRESENTS OPTIMAL VALUES OF THE OPERATING PARAMETERS UNDER VARIOUS SYNTHETIC WORKLOADS

(75) Inventors: Brian J. Salsbery, Boulder, CO (US); Norman S. Gargash, Boulder, CO (US)

(73) Assignee: QUALCOMM Incorporated, San Diego, CA (US)

( * ) Notice: Subject to any disclaimer, the term of this patent is extended or adjusted under 35 U.S.C. 154(b) by 597 days.

(21) Appl. No.: 12/882,368

(22) Filed: Sep. 15, 2010

(65) Prior Publication Data

US 2012/0066526 A1 Mar. 15, 2012

(51) Int. Cl.
*G06F 1/26* (2006.01)
*G06F 1/32* (2006.01)

(52) U.S. Cl.
USPC ........................................................ 713/320

(58) Field of Classification Search
USPC ........................................................ 713/320
See application file for complete search history.

(56) References Cited

U.S. PATENT DOCUMENTS

| 6,321,341 | B1 | 11/2001 | Kamimo et al. |
| 7,017,060 | B2 | 3/2006 | Therien et al. |
| 7,079,904 | B1 | 7/2006 | Forstrom et al. |
| 7,334,145 | B2 | 2/2008 | Grobman |
| 7,464,278 | B2 * | 12/2008 | Cohen et al. ................... 713/320 |
| 7,757,107 | B2 | 7/2010 | Goodrum et al. |
| 2007/0061021 | A1 | 3/2007 | Cohen et al. |
| 2007/0061599 | A1 | 3/2007 | Mentzer et al. |
| 2008/0059111 | A1 * | 3/2008 | Sri-Jayantha et al. ........ 702/132 |

OTHER PUBLICATIONS

International Search Report and Written Opinion—PCT/US2011/043289—ISA/EPO—Nov. 2, 2011.
Wonyoung Kim, Meeta S. Gupta, Gu-Peon Wei and David Brooks, "System Level Analysis of Fast, Per-Core DVFS using On-Chip Switching Regulators." IEEE International Symposium on High-Performance Computer Architecture (HPCA), Feb. 2008.

* cited by examiner

*Primary Examiner* — Thomas Lee
*Assistant Examiner* — Xuxing Chen
(74) *Attorney, Agent, or Firm* — Nicholas A. Cole

(57) ABSTRACT

A method and system for determining optimal operating parameters for conserving power of a portable computing device may include plotting a hypersurface in a coordinate system. The method includes defining one or more axes in a coordinate system, such as a Cartesian coordinate system, that impact power consumption of a PCD and which may be held as constants when applied as workloads on CPU. Then, at least one axis is identified as an unknown or variable which may be optimized for power consumption. After the hypersurface containing optimized values is created for various workload scenarios for the PCD, workloads corresponding to the synthetic workloads described above are applied to the PCD. Workload predictors, like a DCVS algorithm, are executed by the PCD and are observed and compared to the hypersurface. Parameters for the workload predictor may be adjusted based on the values from the hypersurface.

40 Claims, 12 Drawing Sheets

CPU ACTIVITY
CONVENTIONAL ART

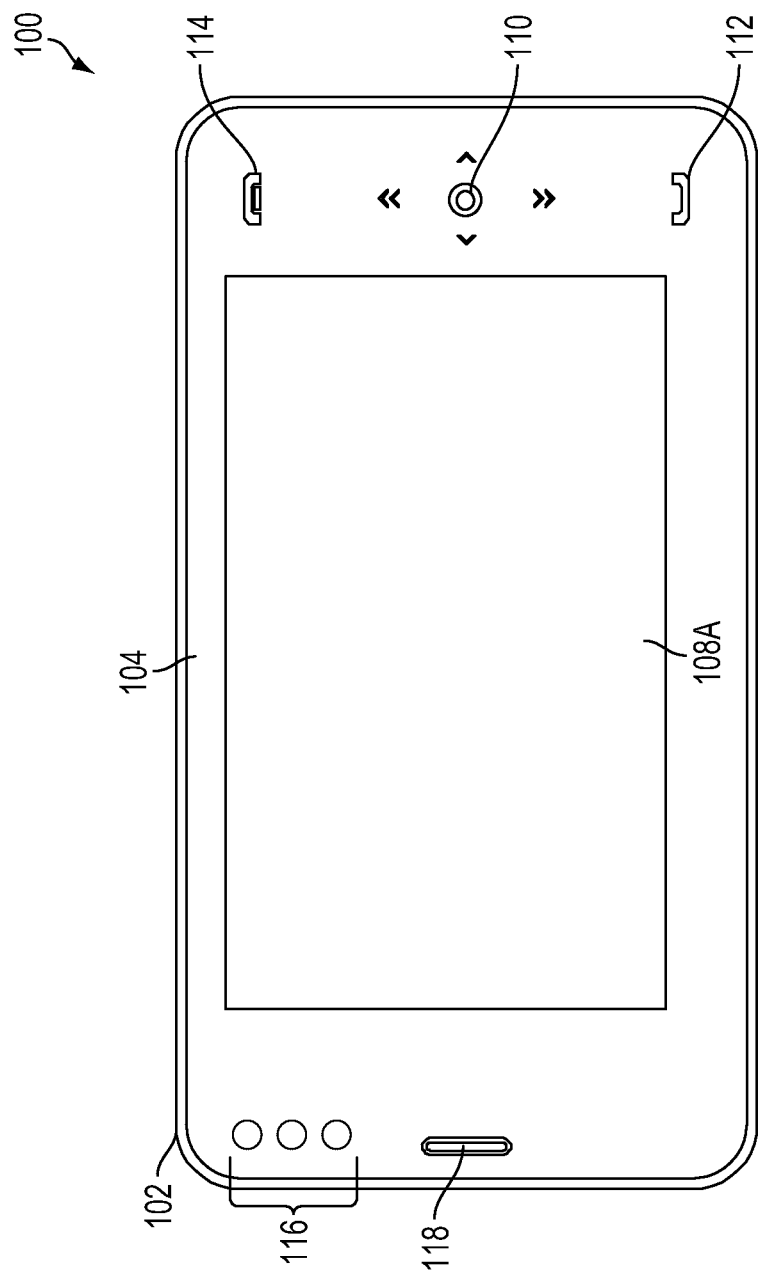

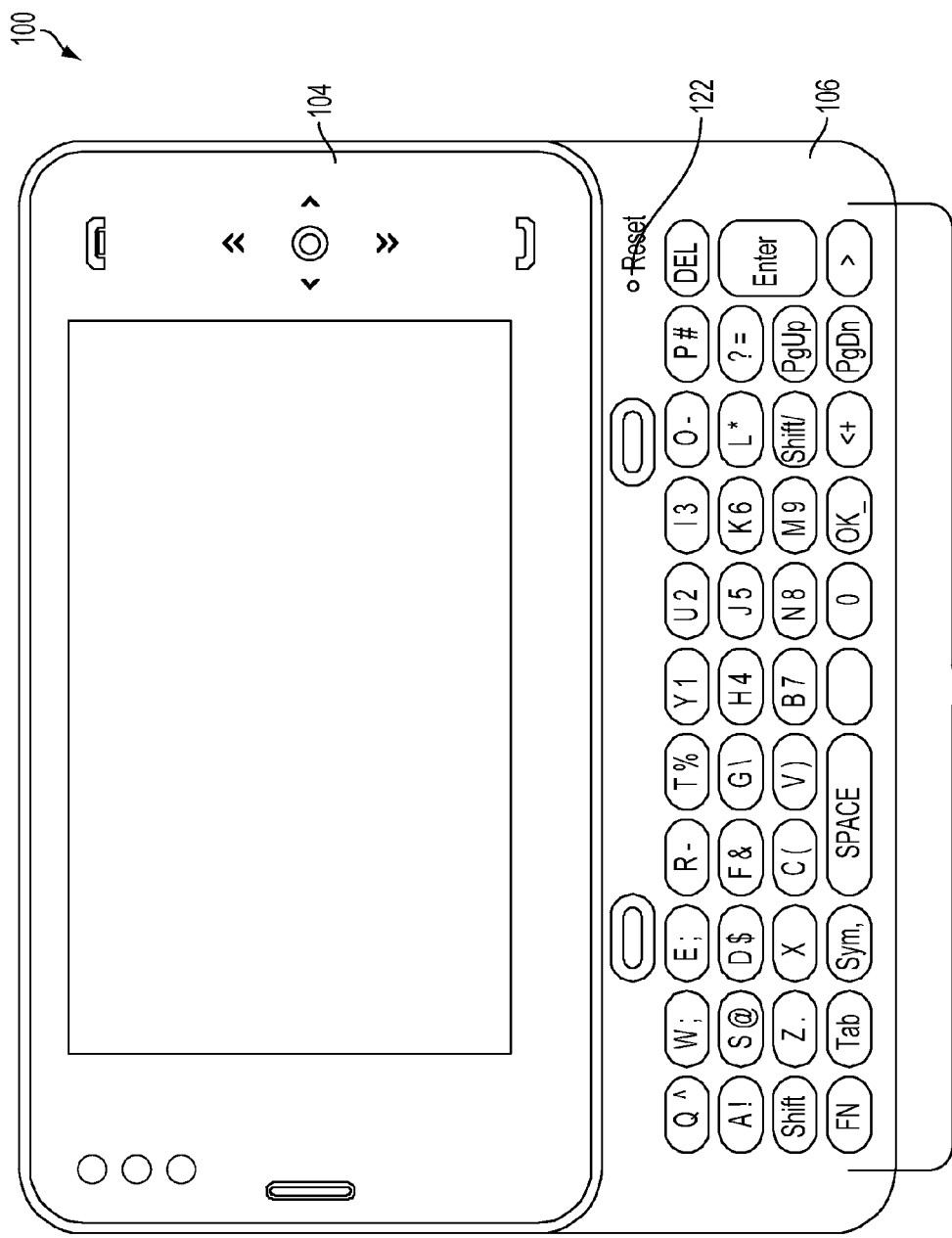

SYNTHETIC WORKLOAD: 20 MIPs, 10 ms PERIOD, OPTIMAL FREQUENCY FOUND TO BE 40 MHz

SYNTHETIC WORKLOAD: 20 MIPs, 20 ms PERIOD, OPTIMAL FREQUENCY FOUND TO BE 80 MHz

SYSTEM AND METHOD FOR DETERMINING OPTIMAL OPERATING PARAMETERS FOR CONSERVING POWER IN A PORTABLE DEVICE FROM A HYPERSURFACE WHICH REPRESENTS OPTIMAL VALUES OF THE OPERATING PARAMETERS UNDER VARIOUS SYNTHETIC WORKLOADS

DESCRIPTION OF THE RELATED ART

Portable computing devices (PCDs) are becoming personal necessities for people on personal and professional levels. These devices may include cellular telephones, portable digital assistants (PDAs), portable game consoles, palmtop computers, and other portable electronic devices. Each of these devices may include a primary function. For example, a cellular telephone generally has the primary function of receiving and transmitting telephone calls.

In addition to the primary function of these devices, many include peripheral functions. For example, a cellular telephone may include the primary function of making cellular telephone calls as described above, and the peripheral functions of a still camera, a video camera, global positioning system (GPS) navigation, web browsing, sending and receiving emails, sending and receiving text messages, push-to-talk capabilities, etc. As the functionality of such a device increases, the computing or processing power required to support such functionality also increases. Further, as the computing power increases, there exists a greater need to effectively manage the processor, or processors, that provide this computing power.

In addition to effectively managing computing power, another problem for PCDs is providing adequate responsiveness during application programs while also conserving power. Power is an essential parameter since most PCDs are battery powered. Further, conserving or extending battery life in PCDs is critical since users often rate the effectiveness of PCDs based on how long a particular PCD may be operated without an electrical charge to replenish its battery power.

One problem that exists in the art is typical power conservation algorithms for PCDs frequently use one power savings selection method to determine the controllable settings for a PCD to conserve power. Conventional power conservation algorithms often use averages or percentages in order to determine controllable settings for a particular PCD. Averages or percentages usually do not take into account operational settings that may achieve the same average or percentages but which may be different at a discrete level.

For example, referring now to FIG. 1A, a first load 10A for a central processing unit is illustrated in graph 9A. The first load 10A has an exemplary period of 0.2 of a millisecond and a fifty-percent duty cycle. The first load 10A also has a maximum frequency of 20 Mhz.

Referring now to FIG. 1B, a second load 15A for a central processing unit is illustrated in graph 9B. Like the first load 10A, this second load 15A has a maximum frequency of 20 MHz and a fifty-percent duty cycle. However, the second load 15A has a period of 0.6 of a millisecond.

Referring now to FIG. 1C, a third load 20A for a central processing unit is illustrated in graph 9C. Unlike the first load 10A, this third load 20A has a maximum frequency of 60 MHz and a 16.7 percent duty cycle. Like the second load 10A, the third load 20A also has a period of 0.6 of a millisecond.

One of ordinary skill in the art recognizes that these multiple workload configurations may yield the same average workload, assuming that Cycles Per Instruction remains constant. For example, one of ordinary skill in the art recognizes that the average workload for each of the workloads 10A, 15A, and 20A of FIGS. 1A-1C is calculated by the area under each curve divided by the measured time. If the measure time of 1.2 milliseconds is used for the three workloads 10A, 15A, and 20A of FIGS. 1A-1C, one of ordinary skill in the art recognizes that the average workload for all three scenarios is equal.

Most conventional power conservation algorithms will base their assumptions on generalizations like the amount of work completed over time. Meanwhile, referring back to FIG. 1A, idle distributions (the off-time durations) for the first duty cycle of the first workload 10A are significantly different when compared to the second duty cycle of the second and third workloads 15A and 20A. Certain power saving operations may be performed for the second duty cycle of the second workload 15A but the same power saving operations may not be performed effectively or as efficiently for the first duty cycle of the first workload 10A or the third duty cycle of the third workload 20A because of the differences in idle distributions (CPU non-working times).

Referring to FIG. 1D, a fourth load 25A is illustrated in graph 9D. This graph 9D emphasizes how workload averages are of limited use for power saving algorithms because of the unique power saving strategies which may be available to a given PCD. For example, at time 0.2 in graph 9D in which the CPU frequency is zero for at least 0.3 of a millisecond between times 0.2 and 0.5, the CPU may enter a sleep cycle and it may be able to power down three devices X, Y, Z given the length of 0.3 of a millisecond. This period of 0.3 of a millisecond on the graph indicates that the CPU is sleeping. This may be accomplished in many ways, such as, but not limited to, gating the clock so the CPU doesn't see any transitions. In essence in this scenario, the CPU sees zero frequency, but the actual clock may not be changed.

When the CPU enters a sleep cycle again at time 0.6 of a millisecond, the CPU may power off a single device X given the length of the sleep cycle of 0.1 millisecond between times 0.6 and 0.7. The graph 9D emphasizes that the longer a CPU sleeps, there are more options for how power of a PCD may be conserved.

Accordingly, what is needed is a system and method that may overcome the problems associated with conventional power saving algorithms that rely on generalizations and averages and which do not account for possible discrete differences among variables that impact power and performance of a PCD.

SUMMARY OF THE DISCLOSURE

A method and system for determining optimal operating parameters for conserving power of a portable computing device are disclosed. The method may include plotting a hypersurface in a coordinate system in order to determine ideal operating conditions for a PCD.

The method includes defining or identifying one or more axes in a coordinate system, such as a Cartesian coordinate system, that impact power consumption of a PCD and which may be held as constants when applied as workloads on a CPU. Then, at least one axis is identified as an unknown or variable which may be optimized (determined empirically or observed) for power consumption. The variable which may be optimized may comprise a controllable parameter. A controllable parameter may be determined empirically, by methodically testing a PCD over a controllable range. As an example, frequency of a CPU may be a controllable parameter which may be optimized for power consumption of a PCD. A non-controllable internal parameter relative to a PCD (which may only be observed by the PCD and cannot be determined empirically) may include a parameter such as temperature of a CPU for a PCD.

Continuing with the steps of the method, while a PCD is an off-line state, meaning that it is not being utilized by an operator, synthetic workloads (corresponding to the axes in the coordinate system which may be held as constants and applied to the CPU) are created to simulate various possible operating conditions of the PCD. For example, a synthetic workload may include a central processing unit (CPU) utilization expressed in millions of instructions per second (MIPS). Another synthetic workload may include a workload period of the CPU expressed in milliseconds. An unknown or variable which may optimized may comprise a frequency of a CPU expressed in MHz which may be determined empirically (in a methodical manner) based on the synthetic workloads.

According to this example, the synthetic workload of MIPS may define the x-axis of the coordinate system while the workload period defines the z-axis of the coordinate system. Next a hypersurface is created by using the synthetic workloads. Specifically, a fixed value is selected on the x-axis while values along the z-axis are varied. Each value on the unknown axis or controlled parameter axis, here the y-axis for CPU Frequency, is optimized meaning that various CPU frequencies are tested until an ideal one is determined with respect to how a particular CPU frequency impacts power consumption of the PCD 100 by using the x-axis and z-axis as constants. This means that for each point which has a constant CPU utilization value and a constant workload period, an optimized CPU frequency may be empirically determined methodically by utilizing the given and set values for the x and z-axis.

This process of fixing values along the x-axis and z-axis and determining values for the unknown or controllable parameter represented by the y-axis is repeated several times until a meaningful hypersurface 555A defined by the coordinate system is created. Next, the PCD is powered up and placed into a normal operating state. Actual workloads corresponding to the synthetic workloads described above are applied to the PCD. Subsequently, workload predictors, such as a dynamic controlled voltage setting (DCVS) algorithm as understood by one of ordinary skill the art, are executed by the PCD and are observed and compared to the hypersurface. Next, values from the workload predictor may be adjusted based on the values from the hypersurface.

BRIEF DESCRIPTION OF THE DRAWINGS

In the FIGs., like reference numerals refer to like parts throughout the various views unless otherwise indicated. For reference numerals with letter character designations such as "102A" or "102B", the letter character designations may differentiate two like parts or elements present in the same FIG. Letter character designations for reference numerals may be omitted when it is intended that a reference numeral to encompass all parts having the same reference numeral in all FIGS.

FIG. 2A is a front plan view of a first aspect of a portable computing device (PCD) in a closed position that may be optimized with the disclosed method and system;

FIG. 2B is a front plan view of the first aspect of a PCD in an open position that may be optimized with the disclosed method and system;

DETAILED DESCRIPTION

Figure 1A:
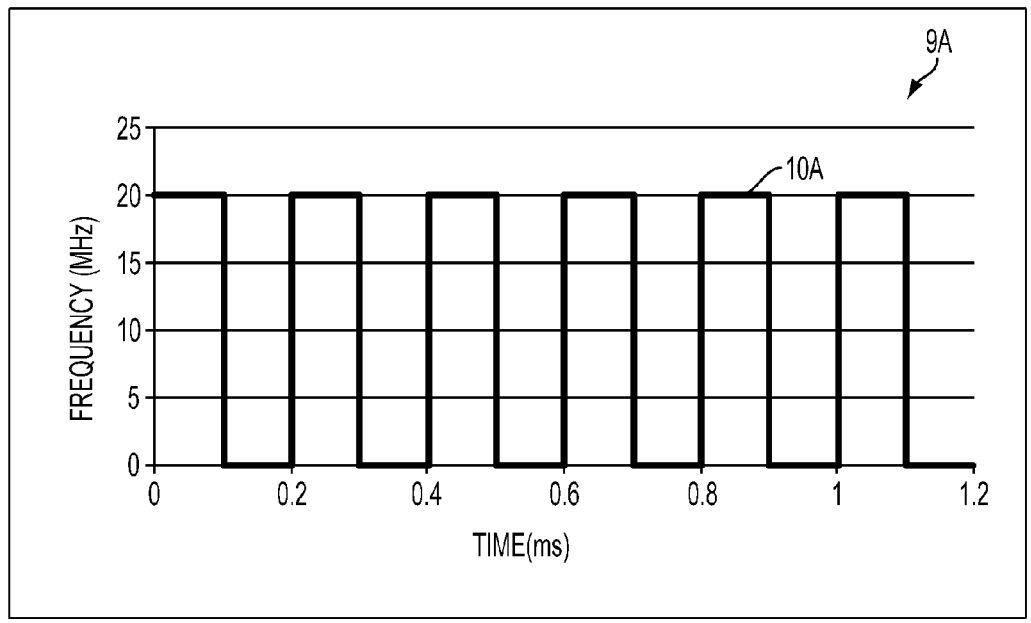
FIG. 1A is a graph illustrating a plot of a first conventional load for a central processing unit over time.
Figure 1B:
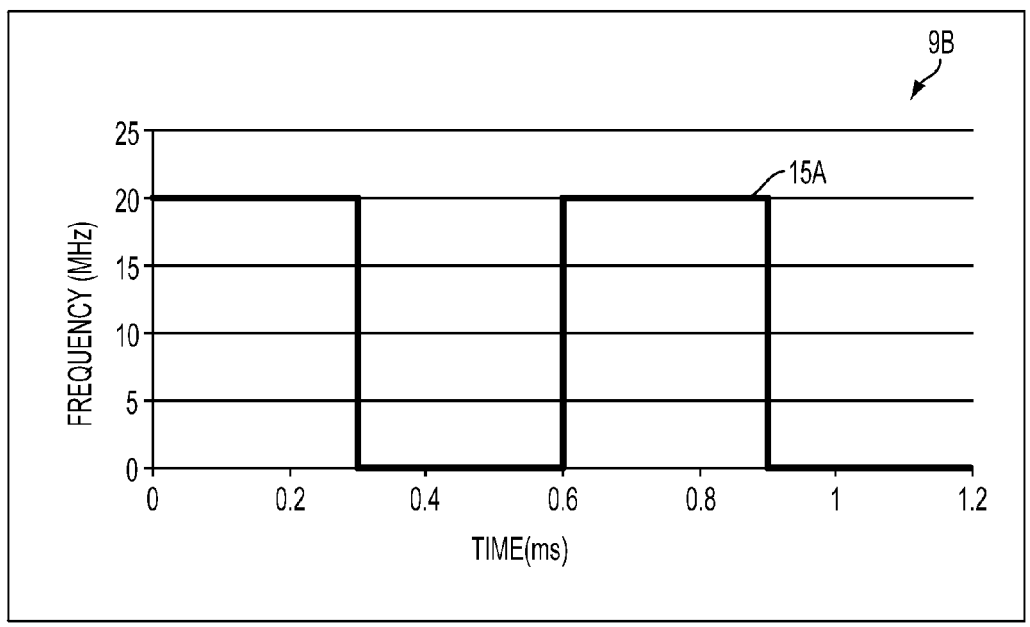
FIG. 1B is a graph illustrating a plot of a second conventional load for a central processing unit over time.
Figure 1C:
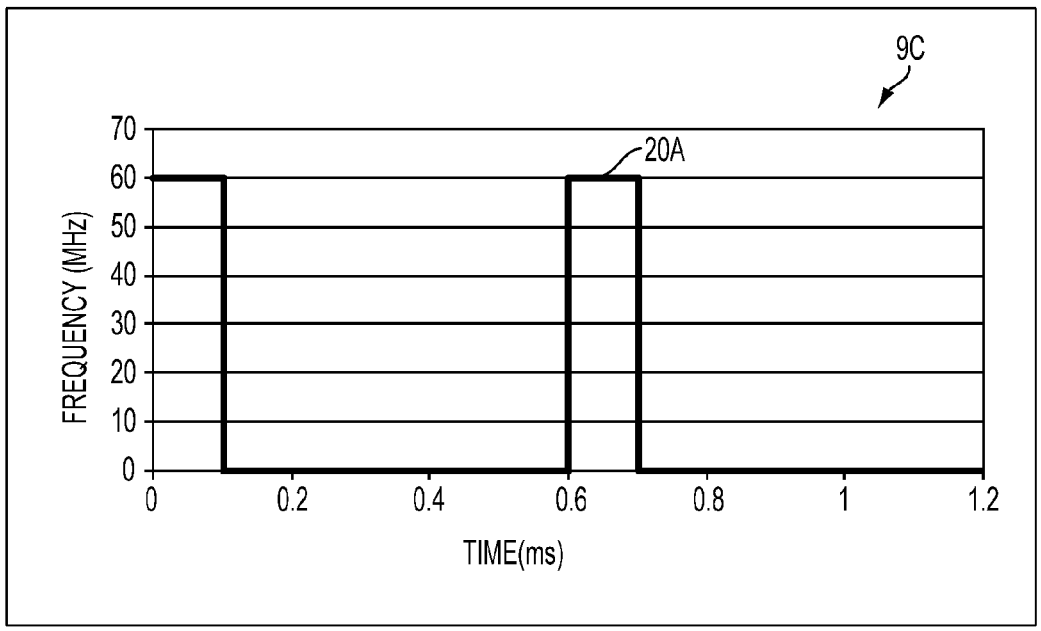
FIG. 1C is a graph illustrating a plot of a third conventional load for a central processing unit over time.
Figure 1D:
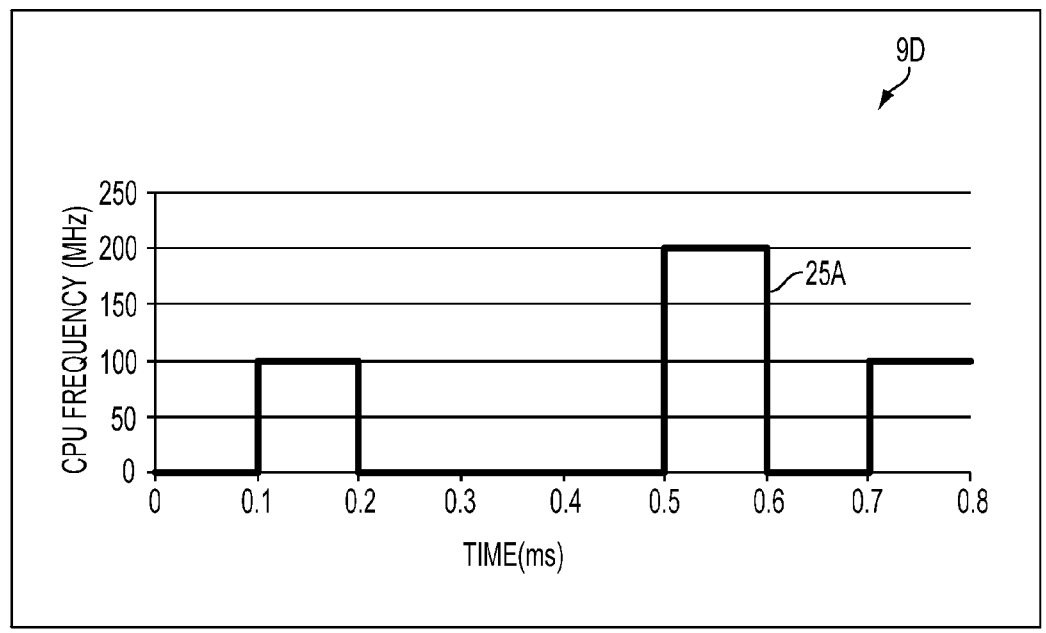
FIG. 1D is a graph illustrating a plot of a fourth conventional load for a central processing unit over time.

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "communication device," "wireless device," "wireless telephone," "wireless communication device," and "wireless handset" are used interchangeably. With the advent of third generation ("3G") wireless technology, greater bandwidth availability has enabled more portable computing devices (PCD) with a greater variety of wireless capabilities. Therefore, a portable computing device (PCD) could be a cellular telephone, a pager, a PDA, a smartphone, a navigation device, or a hand-held computer with a wireless connection or link.

Referring initially to FIG. 2A and FIG. 2B, an exemplary portable computing device (PCD) is shown and is generally designated 100. As shown, the PCD 100 may include a housing 102. The housing 102 may include an upper housing portion 104 and a lower housing portion 106. FIG. 1 shows that the upper housing portion 104 may include a display 108A. In a particular aspect, the display 108A may be a touch screen display. The upper housing portion 104 may also include a trackball input device 110. Further, as shown in FIG. 1, the upper housing portion 104 may include a power on button 112 and a power off button 114. As shown in FIG. 1, the upper housing portion 104 of the PCD 100 may include a plurality of indicator lights 116 and a speaker 118. Each indicator light 116 may be a light emitting diode (LED).

In a particular aspect, as depicted in FIG. 2B, the upper housing portion 104 is movable relative to the lower housing portion 106. Specifically, the upper housing portion 104 may be slidable relative to the lower housing portion 106. As shown in FIG. 2B, the lower housing portion 106 may include a multi-button keyboard 120. In a particular aspect, the multi-button keyboard 120 may be a standard QWERTY keyboard. The multi-button keyboard 120 may be revealed when the upper housing portion 104 is moved relative to the lower housing portion 106. FIG. 2 further illustrates that the PCD 100 may include a reset button 122 on the lower housing portion 106.

Figure 3:
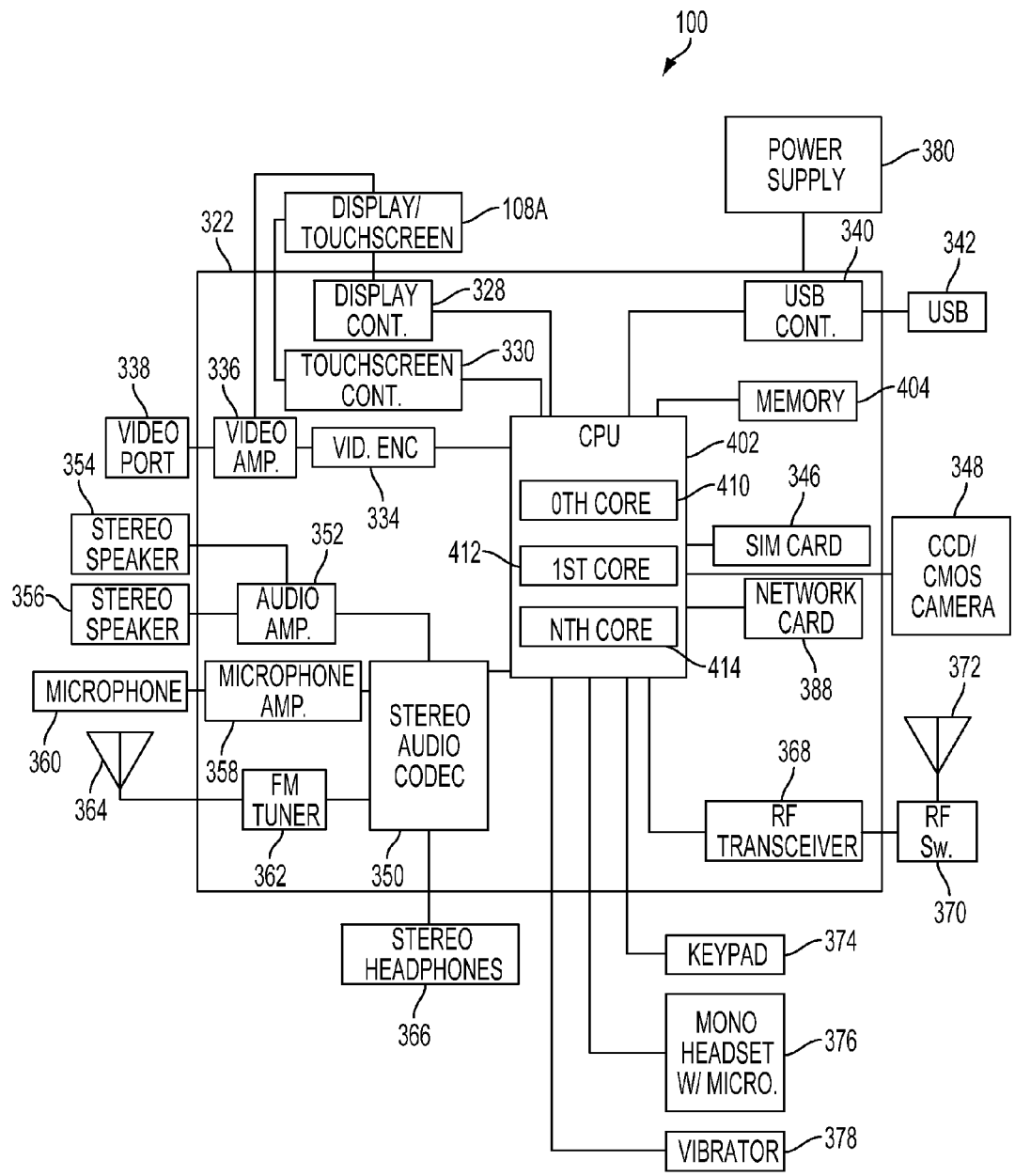
FIG. 3 is a block diagram of a second aspect of a PCD that may be optimized with the disclosed method and system.

Referring to FIG. 3, an exemplary, non-limiting aspect of a portable computing device (PCD) is shown and is generally designated 100. As shown, the PCD 100 includes an on-chip system 322 that includes a multicore CPU 402. The multicore CPU 402 may include a zeroth core 410, a first core 412, and an Nth core 414.

As illustrated in FIG. 3, a display controller 328 and a touch screen controller 330 are coupled to the multicore CPU 402. In turn, a touch screen display 108A external to the on-chip system 322 is coupled to the display controller 328 and the touch screen controller 330.

FIG. 3 further indicates that a video encoder 334, e.g., a phase alternating line (PAL) encoder, a sequential color a memoire (SECAM) encoder, or a national television system(s) committee (NTSC) encoder, is coupled to the multicore CPU 402. Further, a video amplifier 336 is coupled to the video encoder 334 and the touch screen display 108A. Also, a video port 338 is coupled to the video amplifier 336. As depicted in FIG. 3, a universal serial bus (USB) controller 340 is coupled to the multicore CPU 402. Also, a USB port 342 is coupled to the USB controller 340. A memory 404 and a subscriber identity module (SIM) card 346 may also be coupled to the multicore CPU 402. Further, as shown in FIG. 3, a digital camera 348 may be coupled to the multicore CPU 402. In an exemplary aspect, the digital camera 348 is a charge-coupled device (CCD) camera or a complementary metal-oxide semiconductor (CMOS) camera.

As further illustrated in FIG. 3, a stereo audio CODEC 350 may be coupled to the multicore CPU 402. Moreover, an audio amplifier 352 may coupled to the stereo audio CODEC 350. In an exemplary aspect, a first stereo speaker 354 and a second stereo speaker 356 are coupled to the audio amplifier 352. FIG. 3 shows that a microphone amplifier 358 may be also coupled to the stereo audio CODEC 350. Additionally, a microphone 360 may be coupled to the microphone amplifier 358. In a particular aspect, a frequency modulation (FM) radio tuner 362 may be coupled to the stereo audio CODEC 350. Also, an FM antenna 364 is coupled to the FM radio tuner 362. Further, stereo headphones 366 may be coupled to the stereo audio CODEC 350.

FIG. 3 further indicates that a radio frequency (RF) transceiver 368 may be coupled to the multicore CPU 402. An RF switch 370 may be coupled to the RF transceiver 368 and an RF antenna 372. As shown in FIG. 3, a keypad 374 may be coupled to the multicore CPU 402. Also, a mono headset with a microphone 376 may be coupled to the multicore CPU 402. Further, a vibrator device 378 may be coupled to the multicore CPU 402. FIG. 3 also shows that a power supply 380 may be coupled to the on-chip system 322. In a particular aspect, the power supply 380 is a direct current (DC) power supply that provides power to the various components of the PCD 100 that require power. Further, in a particular aspect, the power supply is a rechargeable DC battery or a DC power supply that is derived from an alternating current (AC) to DC transformer that is connected to an AC power source.

FIG. 3 further indicates that the PCD 100 may also include a network card 388 that may be used to access a data network, e.g., a local area network, a personal area network, or any other network. The network card 388 may be a Bluetooth network card, a WiFi network card, a personal area network (PAN) card, a personal area network ultra-low-power technology (PeANUT) network card, or any other network card well known in the art. Further, the network card 388 may be incorporated into a chip, i.e., the network card 388 may be a full solution in a chip, and may not be a separate network card 388.

As depicted in FIG. 3, the touch screen display 108A, the video port 338, the USB port 342, the camera 348, the first stereo speaker 354, the second stereo speaker 356, the microphone 360, the FM antenna 364, the stereo headphones 366, the RF switch 370, the RF antenna 372, the keypad 374, the mono headset 376, the vibrator 378, and the power supply 380 are external to the on-chip system 322.

Figure 4:
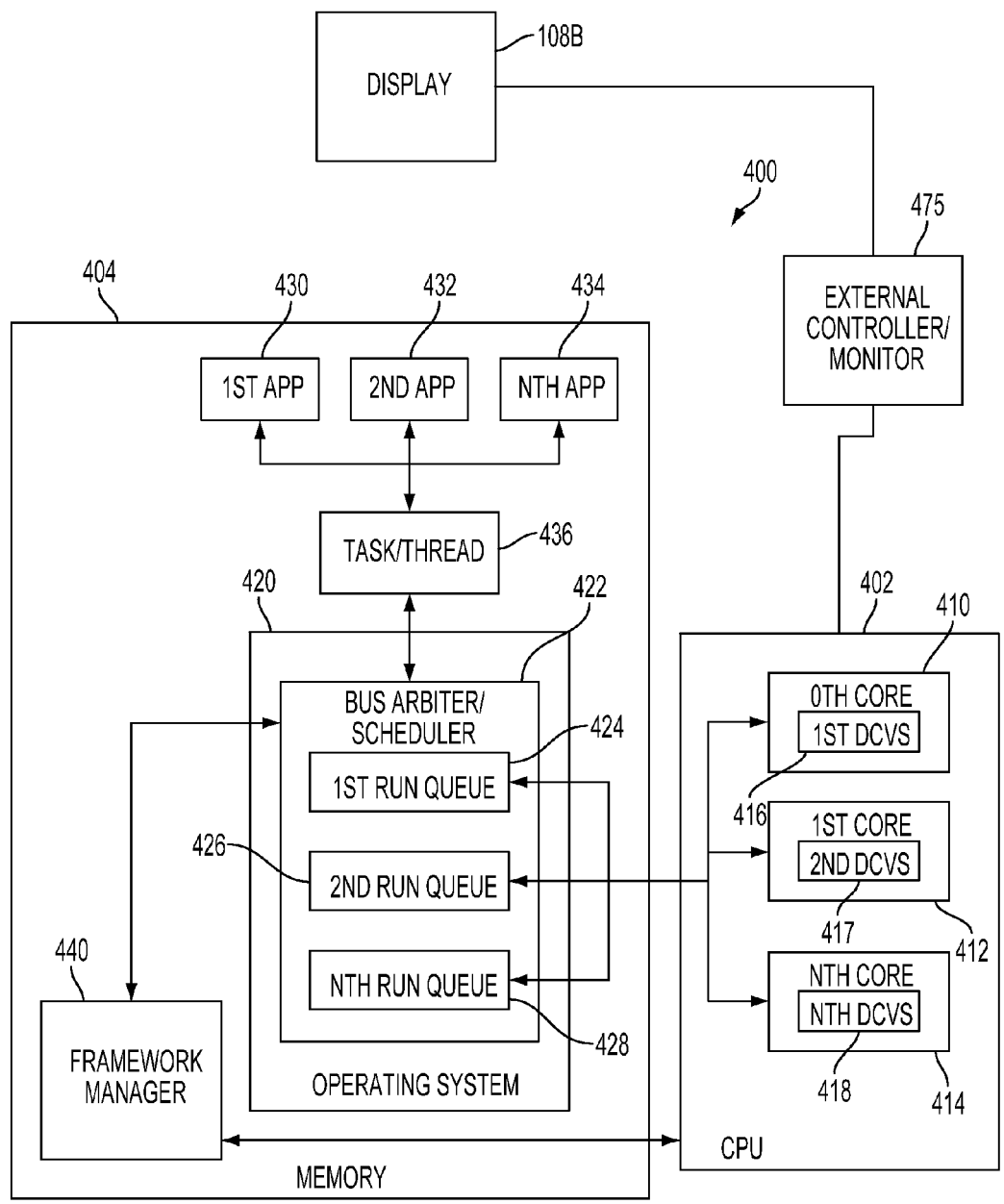
FIG. 4 is a block diagram of a processing system for a PCD that may be optimized with the disclosed method and system.

Referring to FIG. 4, a processing system is shown and is generally designated 400. In a particular aspect, the processing system 400 may be incorporated into the PCD 100 described above in conjunction with FIG. 3. As shown, the processing system 400 may include a multicore central processing unit (CPU) 402 and a memory 404 connected to the multicore CPU 402. The multicore CPU 402 may include a zeroth core 410, a first core 412, and an Nth core 414. The zeroth core 410 may include a zeroth dynamic clock and voltage scaling (DCVS) algorithm 416 executing thereon, as understood by one of ordinary skill in the art. DCVS algorithms may also be referred to as dynamic voltage and frequency scaling (DVFS) algorithms as understood by one of ordinary skill in the art.

The first core 412 may include a first DCVS algorithm 417 executing thereon. Further, the Nth core 414 may include an Nth DCVS algorithm 418 executing thereon. In a particular aspect, each DCVS algorithm 416, 417, 418 may be independently executed on a respective core 412, 414, 416.

Moreover, as illustrated, the memory 404 may include an operating system 420 stored thereon. The operating system 420 may include a bus arbiter or scheduler 422 and the scheduler 422 may include a first run queue 424, a second run queue 426, and an Nth run queue 428. The memory 404 may also include a first application 430, a second application 432, and an Nth application 434 stored thereon.

In a particular aspect, the applications 430, 432, 434 may send one or more tasks 436 to the operating system 420 to be processed at the cores 410, 412, 414 within the multicore CPU 402. The tasks 436 may be processed, or executed, as single tasks, threads, or a combination thereof. Further, the scheduler 422 may schedule the tasks, threads, or a combination thereof for execution within the multicore CPU 402. Additionally, the scheduler 422 may place the tasks, threads, or a combination thereof in the run queues 424, 426, 428. The cores 410, 412, 414 may retrieve the tasks, threads, or a combination thereof from the run queues 424, 426, 428 as instructed, e.g., by the operating system 420 for processing, or execution, of those task and threads at the cores 410, 412, 414.

FIG. 4 also shows that the memory 404 may include a framework manager 440 stored thereon. The framework manager 440 may be connected to the operating system 420 and the multicore CPU 402. Specifically, the framework manager 440 may be connected to the scheduler 422 within the operating system 420. As described herein, the framework manager 440 may monitor the workload on the cores 410, 412, 414 and the framework manager 440 may sample data from the cores 410, 412, 414.

The CPU 402 may be coupled to an external controller and monitor 475 that may comprise a general purpose computer for applying the synthetic workloads described below in connection with FIG. 5. The external controller and monitor 475 may be coupled to a display 108B for displaying a hypersurface as described below in connection with FIG. 5.

In a particular aspect, one or more of the method steps described herein may be stored in the memory 404 or in a memory of the external controller and monitor 475 as computer program instructions. These program instructions may be executed by the multicore CPU 402 as well as by the external controller and monitor 475 in order to perform the methods described herein. Further, the multicore CPU 402, the memory 404, the external controller and monitor 475, or a combination thereof may serve as a means for executing one or more of the method steps described herein in order to sample data within a central processing unit 402 and for measuring performance of the PCD 100 under certain loading conditions.

Figure 5A:
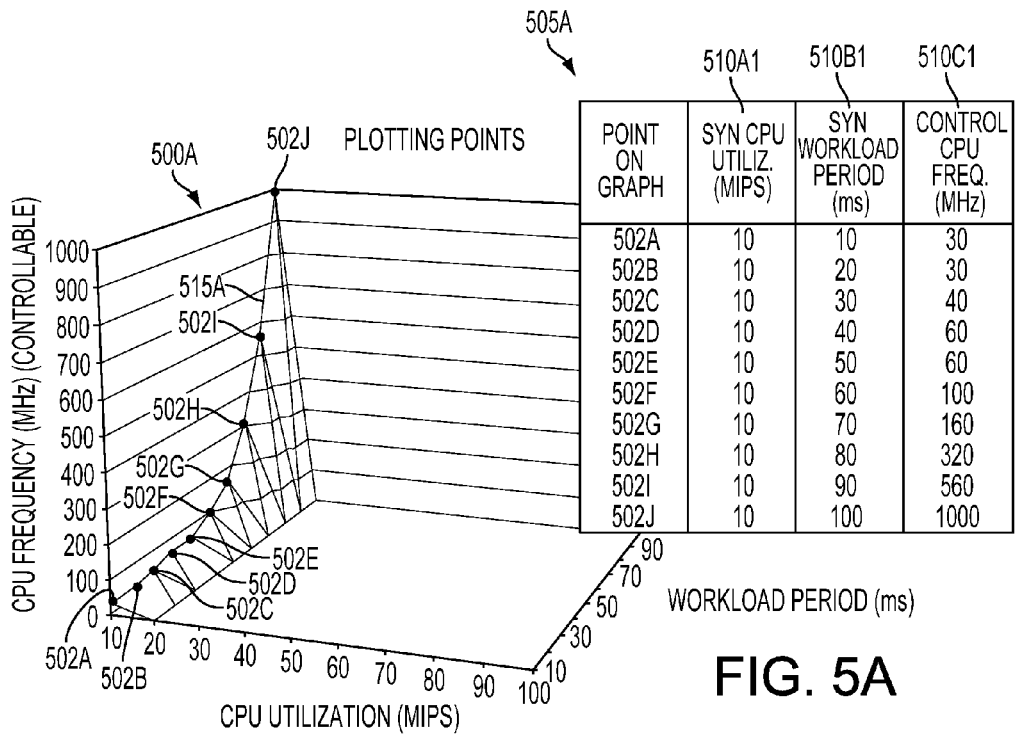
FIG. 5A is a graph illustrating a three-dimensional plot of a first line of points in a Cartesian coordinate system that includes an empirically determined or observed variable, such as CPU frequency, on the y-axis, a first synthetic workload, such as CPU utilization (in MIPS) on the x-axis, and a second synthetic work load, such as a workload period, on the z-axis.

FIG. 5A is a graph 500A illustrating a three-dimensional plot of first line of points 502A-J in a Cartesian coordinate system that includes an empirically determined variable 510C1, such as CPU frequency, represented by the y-axis; a first synthetic workload 510A1, such as CPU utilization (in MIPS) represented by the x-axis, and a second synthetic work load 510B, such as a workload period, represented by the z-axis. In this example, the CPU 402 of FIG. 3 may be tested off-line when it is coupled to the external controller and monitor 475 (which is not during typical or normal use by an operator of the portable computing device 100), in which the CPU 402 may be tested with the first and second synthetic workloads 510A1 and 510B1 that are presented in the first two columns of the first chart 505A.

The first synthetic workload 510A1 of the first column comprises CPU utilization expressed in MIPs, while the second synthetic workload 510B1 of the second column comprises a period of operation for the CPU 402 expressed in milliseconds. The first synthetic workload 510A1 is held at a constant value, and for this case, that value is ten MIPS, while the second synthetic workload 510B1 is varied. In the example shown, the second synthetic workload 510B1 is varied in set increments of ten milliseconds. However, one of ordinary skill in the art will appreciate that other increments are within the scope of the invention in addition to non-equal increments. The values for these two sets of synthetic workloads are tested or applied to the CPU 402.

One of ordinary skill in the art will appreciate that other synthetic workloads corresponding to the one or more axes in the coordinate system of graph 500A which impact power consumption of the PCD and that simulate various possible operating conditions of the PCD, besides CPU utilization and a CPU period, are within the scope of the invention. Other axes, which may represent synthetic workloads, include, but are not limited to, percent of utilization of a CPU, distribution of off-periods or idle times for a CPU, frequency of interrupts for a CPU, interrupt separation, and length of sleep periods for a CPU.

For each row in the first chart 505A of values, an unknown variable corresponding to the y-axis which may comprise a controllable parameter that influences power consumption, such as CPU frequency, may be determined empirically and is ultimately optimized based on the values provided by the synthetic workloads 510A1, 510B1 in any given row of the first chart 505A. For the controllable parameter that comprises a frequency for the CPU 402, various frequencies may be tested with the CPU 402 in order to determine optimal power which is consumed by the PCD 100 given the stress conditions provided by the synthetic workloads 510A, 510 B. The optimal power consumption for a particular CPU frequency may be projected on graph 500A if desired (but is not illustrated in FIG. 5A). In other words, for each optimized CPU frequency 510C1 listed in the fourth column of the first chart 510A, an observed power consumption may be calculated.

Each row of Chart 505A corresponds to the three coordinates for a given point 502A in graph 500A and listed in the first chart 505A in the first column. The set of points 502 listed in the first column of the first chart 505A form a first line 515A as illustrated in graph 500A.

Figure 5B:
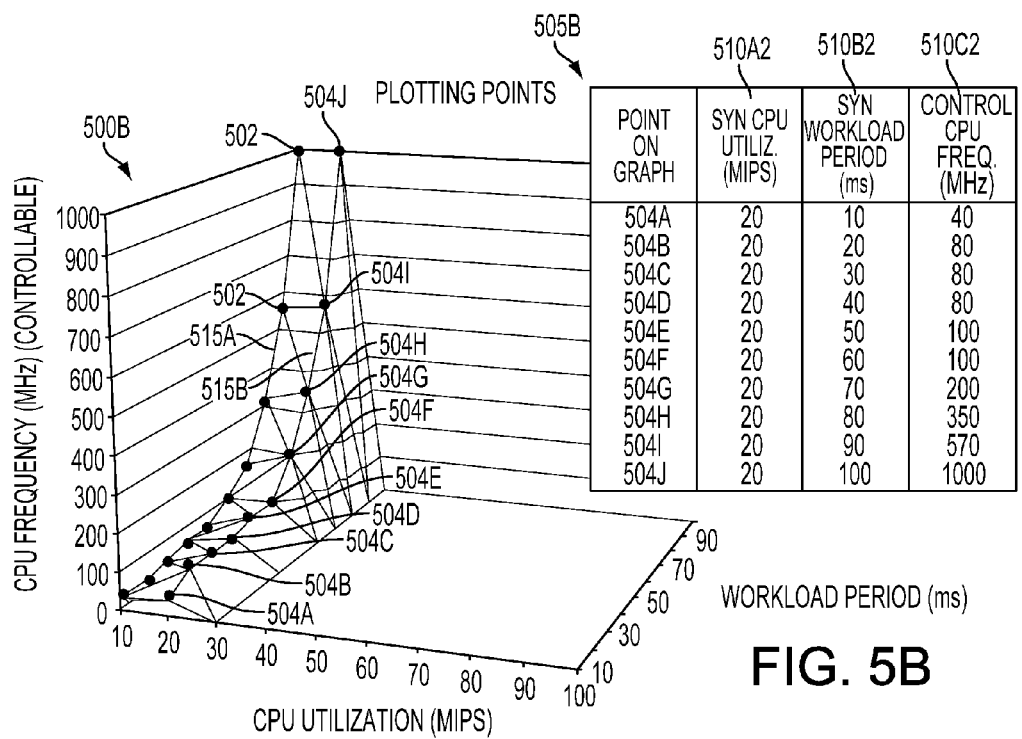
FIG. 5B is a graph illustrating a three-dimensional plot of a second line of points in the Cartesian coordinate system defined in FIG. 5A.

FIG. 5B is a graph 500B illustrating a three-dimensional plot of a second line 515B of points 504A-J in the Cartesian coordinate system defined in FIG. 5A. FIG. 5A also includes a second chart 505B that comprises a first column listing the points 504A-J, a second column listing the first synthetic workload 510A2 held at a second constant value (different relative to the second column of the first chart 505A), and a third column listing the second synthetic workload 510B2 which is varied. The second chart 505B also has a fourth column which lists the empirically determined or optimized controllable parameter, and for this case, that controllable parameter is CPU frequency 510C2 which is listed. The fifth column may list the observed power consumption 510D2 similar to the fifth column of the first chart 505A of FIG. 5A.

Each point on this second line 515B is calculated, like those of the first line 515A. For example, referring now to FIG. 5C, this Figure is a graph 500C illustrating a first plot 520A of a synthetic workload based on two coordinates, twenty MIPs and 10 milliseconds, corresponding to a first point 504A on the second line 515B of FIG. 5B in which the third coordinate, 40 MHz, for the first point 504A, the Frequency of a CPU represented by the y-axis, is empirically determined off-line. Specifically, the first plot 520A is shown to have a period of ten milliseconds while the CPU utilization (not illustrated) is provided at twenty MIPs. Various CPU frequencies may be tested and analyzed under these load conditions (20 MIPs and 10 ms) in order to determine what is the optimal CPU frequency for handling these load conditions provided by the synthetic workloads and which provides for the most conserved power. In this example, 40 MHz was empirically determined to be the optimal CPU frequency for conserving the most power under the load conditions of 20 MIPs and period of 10 ms as illustrated in the first plot 520A of FIG. 5A. This value of 40 MHz is the third coordinate for the first point 504A of line 515B and is listed in the first row and fourth column of the second chart 505B of FIG. 5B.

Figure 5C:
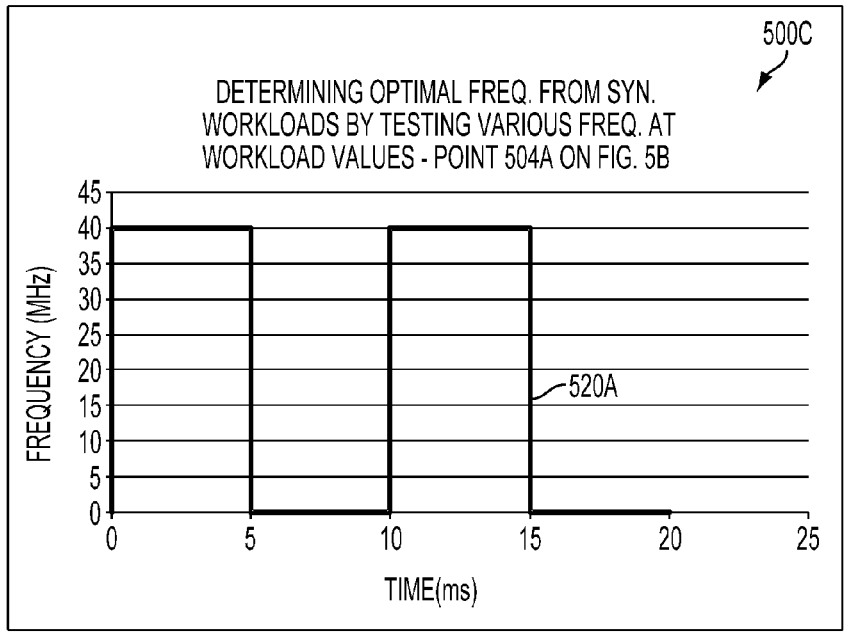
FIG. 5C is a graph illustrating a plot of a synthetic workload based on two coordinates corresponding to a first point on the second line of FIG. 5B in which the third coordinate for the first point, the Frequency of a CPU plotted on the y-axis, is empirically determined off-line.
Figure 5D:
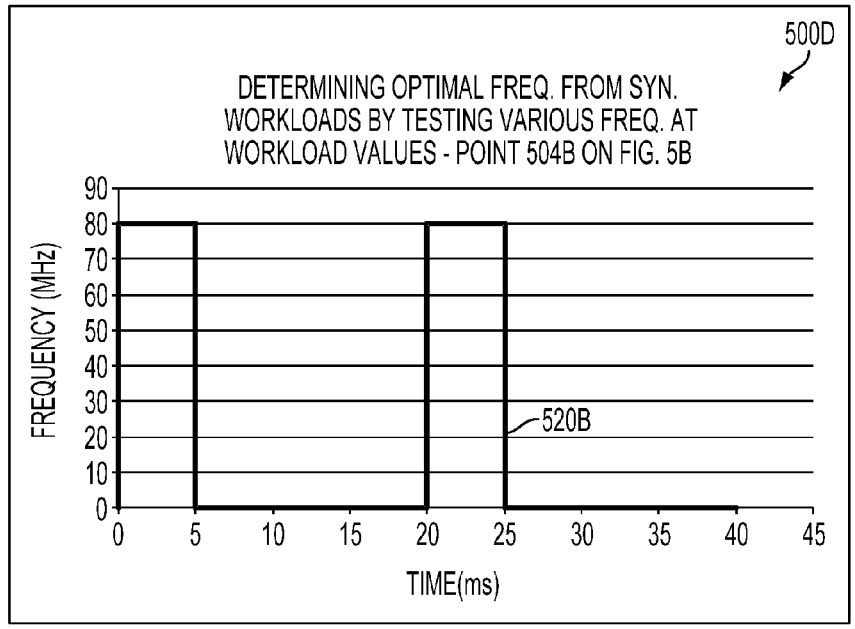
FIG. 5D is a graph illustrating a plot of a synthetic workload based on two coordinates corresponding to a second point on the second line of FIG. 5B in which the third coordinate for the second point, the Frequency of a CPU plotted on the y-axis, is empirically determined off-line.

Similarly, referring now to FIG. 5D, like FIG. 5C, this figure is a graph 500D illustrating a second plot 520B of a synthetic workload based on two coordinates, 20 MIPs and 20 milliseconds, corresponding to a second point 504B on the second line 515B of FIG. 5B in which the third coordinate for the second point 504B, the Frequency of a CPU 402 represented by the y-axis, is empirically determined off-line. Like FIG. 5C, in this Figure Various CPU frequencies may be tested and analyzed in order to determine what is the optimal CPU frequency for handling the load conditions provided (20 MIPs and 20 ms) by the two synthetic workloads and which provides for the most conserved power. In this example, 80 MHz was determined to be the optimal CPU frequency for conserving the most power under a load of 20 MIPs and 20 ms, and was illustrated in the first plot 520A of FIG. 5A. This value of 80 MHz is the third coordinate for the second point 504B of line 515B and is listed in the second row and fourth column of the second chart 505B of FIG. 5B.

One of ordinary skill in the art will appreciate that other controllable parameters besides CPU frequency which may impact performance and power characteristics of a portable computing device 100 and which may be optimized are within the scope of the invention. For example, other controllable parameters which may be optimized for power consumption include, but are not limited to, bus bandwidth, and memory bandwidth.

The method and system for optimizing power consumption under certain load conditions also covers or includes other non-controllable, observable or measured parameters, as well as external and environmental conditions relative to the PCD 100, which may impact performance and power characteristics of the PCD 100. These non-controllable parameters defined as such relative to a PCD 100 operated normally by an operator in an on-line state. When a PCD 100 is tested in an off-line state (not being used normally by an operator), then, in a sense, there is an aspect of control over the non-controllable parameter in that conditions of the PCD 100 may held in a constant state to observe the non-controllable parameter. Once a value for the non-controllable parameter is observed, then the controllable parameters may be adjusted in a predetermined, methodical manner so that the next value for the non-controllable parameter may be observed. Non-controllable, observable or measured parameters may include, but are not limited to, temperature, network bandwidth, volume of streaming data, and wireless signal strength.

Figure 5E:
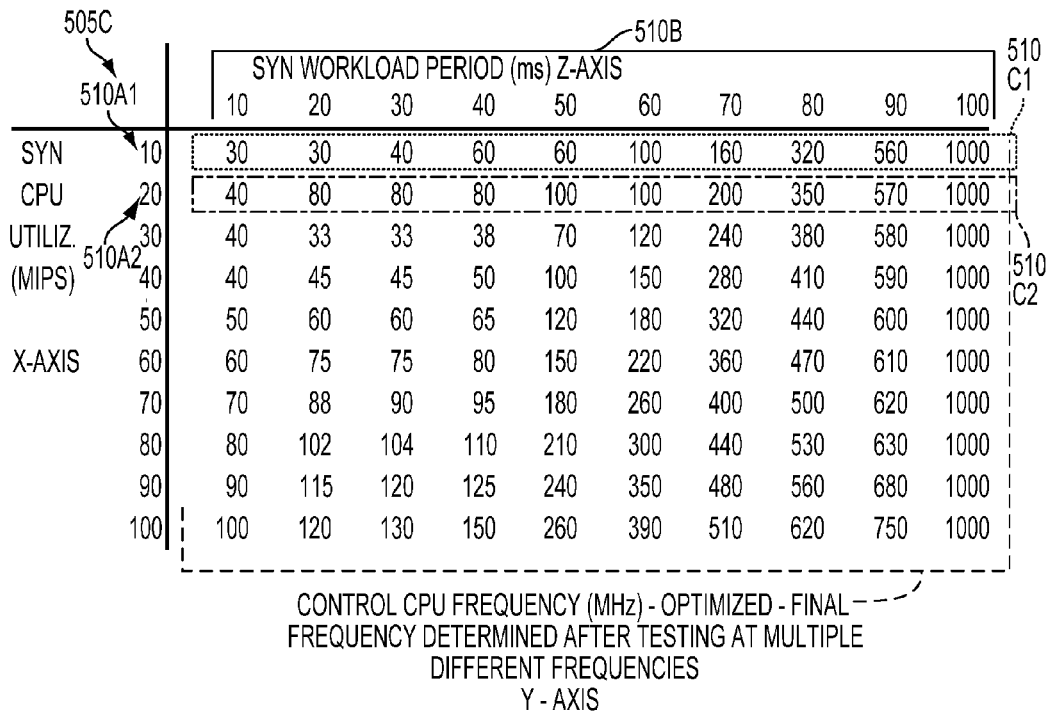
FIG. 5E is a chart providing empirically determined values for the y-axis of a hypersurface of a FIG. 5F that correspond with synthetic workloads comprising values for the z-axis positioned along a first top, row of the chart and values for the x-axis positioned along a first, far left column of the chart.
Figure 5F:
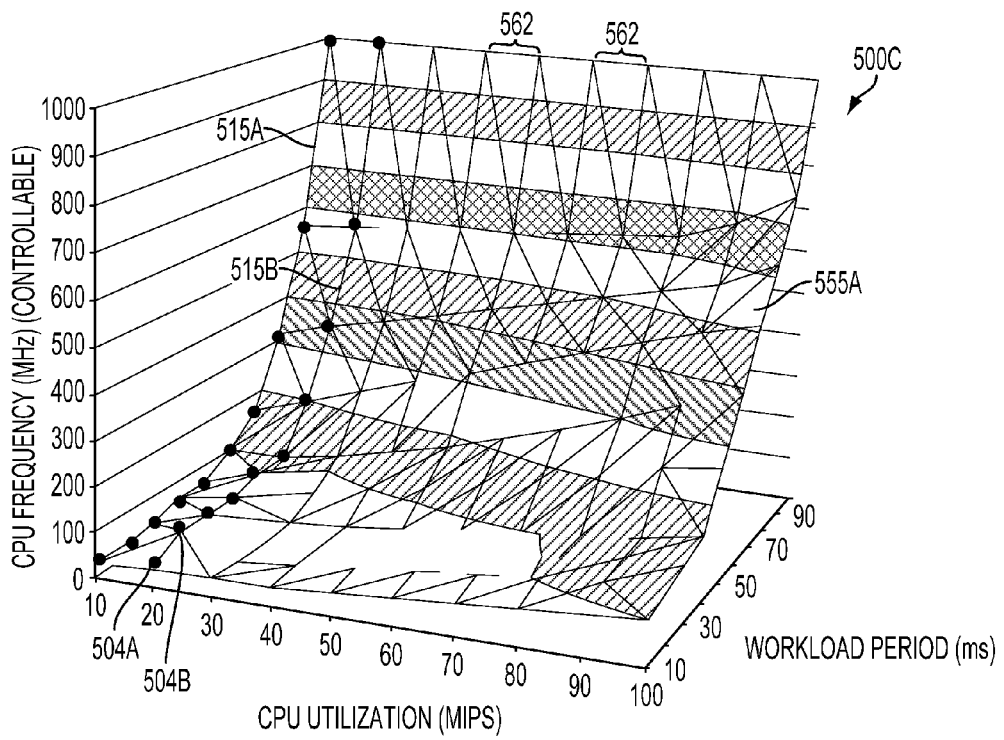
FIG. 5F is a graph illustrating a three-dimensional plot of a hypersurface which corresponds with the first and second lines of FIGS. 5A-5B and the empirically determined values for the y-axis which corresponds with the chart of FIG. 5E.

FIG. 5E is a chart 505C providing empirically determined values for the y-axis of a hypersurface 555A of FIG. 5F. These empirically determined values for the y-axis correspond with the first and second synthetic workloads in which values for the z-axis (that represent the workload period in ms) are placed along a first top, row of the chart 505C and values for the x-axis (that represent the synthetic workload of MIPs) are placed along a first, far left column of the chart 505C.

In other words, the first entry 510A1 of the first column of this chart 505C generally corresponds with the first column of the first synthetic workload 510A1 for the first chart 505A of FIG. 5A. Meanwhile, the first row 510B of the chart 505C generally corresponds with the second column 510B1 of the first chart 505A of FIG. 5A. The second row 510C1 of chart 505C, starting in the second column, generally corresponds with the CPU frequency 510C1 optimized and listed in the fourth column of chart 505A of FIG. 5A.

The second entry 510A2 of the first column of this chart 505C generally corresponds with the first column of the first synthetic workload 510A2 for the second chart 505B of FIG. 5B. The third row 510C2 of chart 505C generally corresponds with the CPU frequency 510C2 optimized and listed in the fourth column of the second chart 505B of FIG. 5B.

FIG. 5F is a graph 500C illustrating a three-dimensional plot of a hypersurface 555A which corresponds with the first and second lines 515A, 515B of FIGS. 5A-5B and the empirically determined values for the y-axis which correspond with the chart 505C of FIG. 5E. In other words, the first and second lines 515A, 515B form portions of a hypersurface 555A that is made up of a plurality of lines 515. The plurality of lines 515 are calculated by changing the first and second synthetic workloads 510A, 510B and empirically determining the controllable parameter represented by the y-axis, as described above in connection with FIGS. 5A-5E. For the case illustrated by graph 500C, the controllable parameter represented by the y-axis is CPU frequency that is determined by testing of the CPU 402 for the PCD 100. To form the hypersurface 555A, the space 562 between the lines 515 is connected by a geometric surface as understood by one of ordinary skill in the art.

Figure 6:
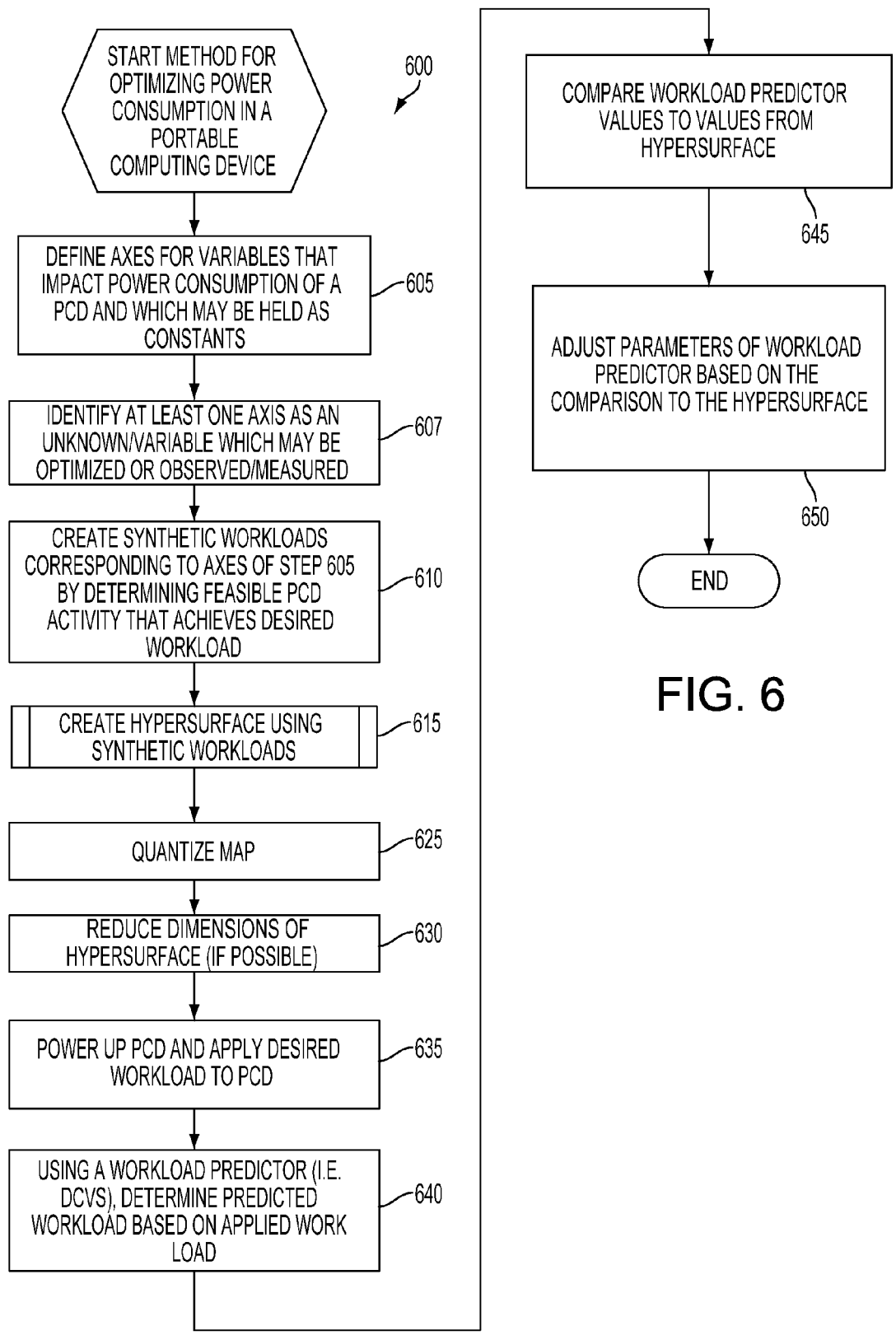
FIG. 6 is a flowchart illustrating a method for optimizing power consumption for a portable computing device.

FIG. 6 is a flowchart illustrating a method 600 for optimizing power consumption of a portable computing device 100. Block 605 is the first step in the process 600 for optimizing power consumption of a PCD 100. In block 605, the axes for variables that may impact the power consumption of a PCD 100 and which may be held as constants to provide loading conditions for a CPU 402 of the PCD 100 may be defined. These axes define a power space and also defined a workload. For example, as illustrated in FIG. 5A, two axes have been defined: the x-axis represents a workload for a CPU 402 expressed in MIPs while the z-axis represents a workload for a CPU 402 expressed as a period in milliseconds for the CPU 402.

One of ordinary skill in the art recognizes that additional dimensions for defining a workspace beyond the two axes illustrated (the x-axis and z-axis) are well within the scope of the invention. Variables that may impact the power consumption of a PCD 100 and which may be held as constants to provide loading conditions for a CPU 402 of the PCD 100 may include, but are not limited to, percent of utilization, frequency of interrupts, interrupt separation (i.e. statistical distribution), length of sleep periods, and other like parameters which may affect or impact power consumption of a PCD 100. The graph 500 may have as many dimensions that may be appropriately handled in a computer-implemented fashion as understood by one of ordinary skill the art.

In block 607, at least one axis, such as the y-axis of FIG. 5A, is identified as an unknown that may be observed or a parameter that may be controlled and which may be optimized in an empirical, methodical manner to optimize power consumption of the PCD 100. In the exemplary embodiment of FIG. 5A, the y-axis representing the controllable parameter comprises a frequency of the CPU 402 for the PCD 100. Other controllable parameters may include, but are not limited to, bus bandwidth, and memory bandwidth.

As noted previously the y-axis may also represent an unknown or variable that may impact power consumption as well as performance of a PCD 100 and which is simply observed as a result of the loading conditions provided by the other axes which represent variables that may be held as constants to provide the loading conditions. Typically, these types of parameters cannot be controlled or varied by a PCD 100. Such parameter types may also be referred to as non-controllable parameters (relative to a PCD 100 operated normally by an operator in an on-line state). As discussed above, when a PCD 100 is tested in an off-line state (not being used normally by an operator), then, in a sense, there is a sense of control over the non-controllable parameter in that conditions of the PCD 100 may held in a constant state to observe the non-controllable parameter. Once a value for a non-controllable parameter is observed, then the controllable parameters may be adjusted in a predetermined, methodical manner so that the next value for the non-controllable parameter may be observed. These unknowns or variables, described as non-controllable parameters, that may impact power consumption of a PCD 100 and performance which may be simply observed as a result of loading conditions and environmental conditions (i.e. external temperature of a PCD 100) include, but are not limited to, internal temperature of the PCD 100, network bandwidth, volume of streaming data, and wireless signal strength.

Next, in block 610, synthetic workloads may be created by determining feasible activity of a PCD 100 that may achieve the same work desired overtime. For example, a desired workload may look like the synthetic workloads 520 of FIGS. 5C and 5D.

Next, in routine block 615, a hypersurface 555A may be created by using the values taken from the synthetic workloads, such as those illustrated in FIGS. 5C-5D. Specifically, synthetic workloads such as CPU utilization expressed in MIPs and period expressed in milliseconds for the CPU 402 of FIGS. 5C-D may be generated and the optimal frequency for CPU 402 that reduces power consumption the most for a given set of loading conditions may be derived or determined in a methodical, empirical manner. Further details about routine block 615 will be described below in connection with FIG. 7.

Subsequently, in block 625 the dimensions of the graph 500C containing the hypersurface 555A created in routine block 615 may be quantized. As understood by one of ordinary skill in the art, quantization is the process of approximating a continuous range of values (or a very large set of possible discrete values) by a relatively small ("finite") set of values which can still take on a continuous range or integer values. For example, rounding a real number in the interval [0,100] to an integer is known as quantization. For example, rounding to the nearest integer (rounding ½ up) replaces the interval [c−0.5, c+0.5) with the number c, for integer c. The values of each dimension of the map for the hypersurface may be quantized as understood by one of ordinary skill in the art.

Next, in block 630, the dimensions, such as the x, y, z axes of FIGS. 5A-5B, are reduced in order to make the graph 500C of FIG. 5F and the corresponding hypersurface 555A more practical for a target PCD 100. Reduction may be made through any number of methods known to one of ordinary skill the art. For example, one exemplary method of production includes run length encoding. Another exemplary method includes removal of a dimension if such dimension is not found to significantly impact or effect of the power consumption for all operating points within the hypersurface 555A. That is, if it is found that power is significantly independent of the dimension being mapped, then this dimension may be removed from the map.

In block 635, a PCD 100 may be powered up and applied with the desired workload. Next, in block 640, using a workload predictor, such as a power conservation algorithm like DCVS described above in connection with FIG. 4, a predicted workload may be determined based on the input of an actual workload applied to the PCD 100.

In block 645, one or more values from the workload predictor based on the applied loading conditions, such as MIPs and period in milliseconds, may be compared to the empirically determined or observed y-axis values provided by the hypersurface 555A. The y-axis values provided by the hypersurface 555A may be found by using the current loading conditions as the x and z coordinates which are also being assessed by the workload predictor.

In block 650, the parameters for the workload predictor may be adjusted upon the comparison conducted in block 645. For example, the workload predictor may be evaluating the loading conditions which correspond to point 504A of FIG. 5B in which the loading conditions comprise a CPU utilization of twenty MIPs and a workload period of ten milliseconds.

Suppose the workload predictor, like a DCVS algorithm noted above, estimates/predicts an upcoming load of 20 MIPS with a period of 10 ms for the current set of measured conditions. The comparison between CPU utilization and period in the second chart 505B of FIG. 5B may be made in block 645 described above. In this block 450, the comparison would reveal that the optimal CPU frequency for this workload prediction is 40 MHz. So in this block 450, the workload predictor may associate it predicted loading conditions with the optimal CPU frequency found in the hypersurface 555A. The workload predictor may store these values as three co-ordinates (20 MIPs, 40 MHz, 10 ms) which correspond to Point 504A of the hypersurface 555A of FIG. 5F. The process then ends.

Figure 7:
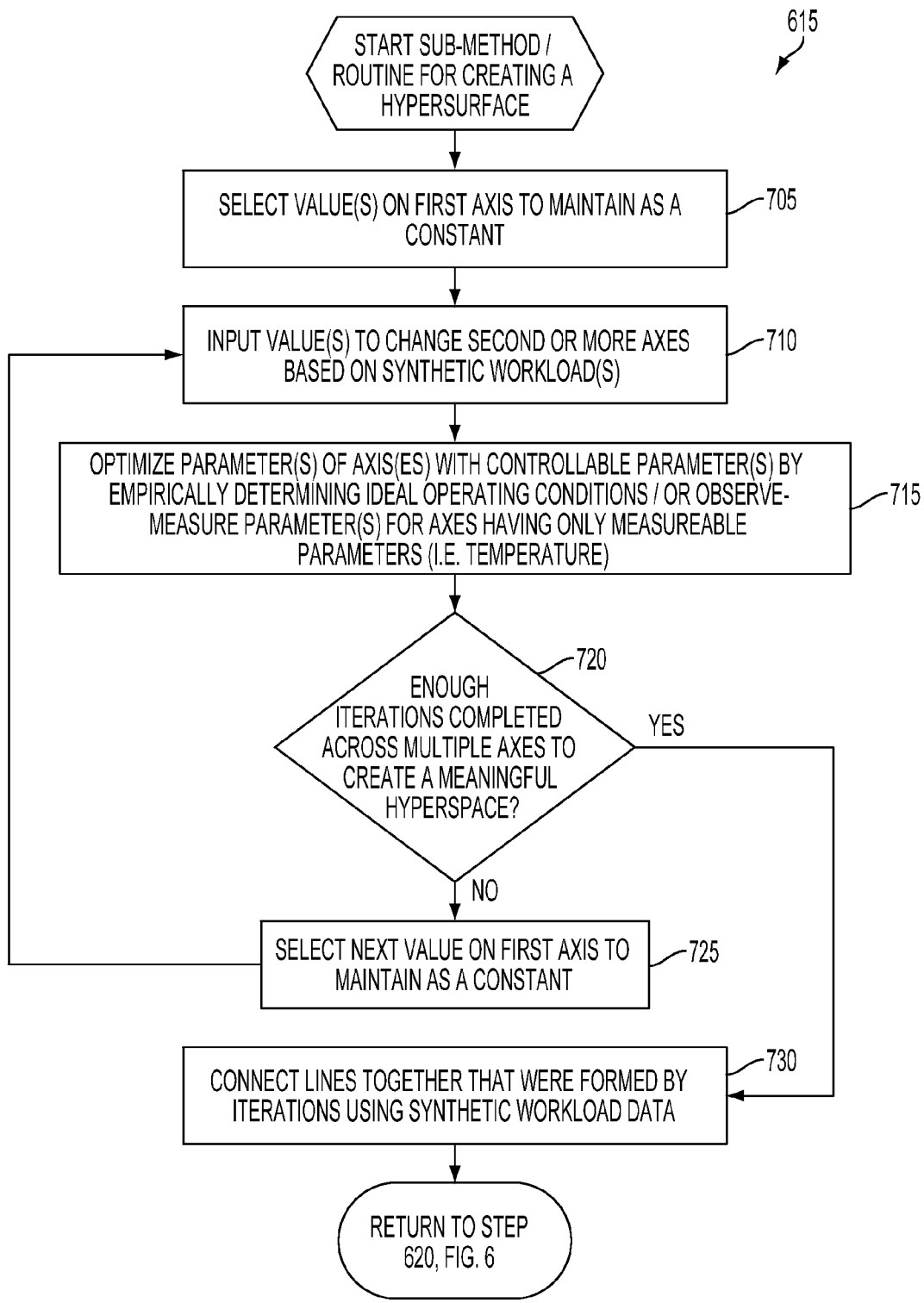
FIG. 7 is a flowchart illustrating a sub-method or a routine of FIG. 7 for creating a hypersurface in a N-Dimensional space.

FIG. 7 is a flowchart illustrating a sub-method or a routine 615 of FIG. 7 for creating a hypersurface 555A in an N-Dimensional space. For the exemplary hypersurface 555A of FIG. 5F, the N-Dimensional space comprises a three-dimensional space.

Block 705 is the first step in the routine 615 four creating a hypersurface 555A for this N-dimensional space. This routine 615 is typically implemented as nested "for loops" as understood by one of ordinary skill in the art. In block 705, a value is selected on the first axis that is maintained as a constant. For the example in FIG. 5A, the CPU utilization expressed in MIPs is maintained at a set value of ten MIPs.

For the example in FIG. 5B, the CPU utilization expressed in MIPs is maintained at a set value of twenty MIPs.

Next, in block 710, values along a second axis and additional axes are changed while the while the single value along the first axis is maintained as a constant. For example, block 710 generally correspond to the third column of the first and second charts 505A, 505B of FIG. 5A and FIG. 5B. The third column of these two charts 505A, 505B correspond with a workload period for a CPU 402 expressed in milliseconds that may be changed in uniform increments, such as an increment of ten milliseconds. However, one of ordinary skill in the art recognizes that other increments are within the scope of the invention and may include uneven or non-uniform increments.

Next, in block 715, the values along the unknown axis may be observed or solved for in an empirical manner by adjusting the controllable parameter axes in a methodical manner. In the example illustrated in FIG. 5F, the y-axis represents a frequency of the CPU 402 which may be solved for empirically, methodically adjusting values for the controllable parameters. Examples of single values along the y-axis which were solved for in an empirical manner are illustrated in FIG. 5C and FIG. 5D. In FIG. 5C, the workload for the CPU 402 was held at a constant value of twenty milliseconds while the CPU utilization was held at a constant value of ten MIPs. The frequency for the CPU 402 was determined empirically and was discovered to be an optimal 40 MHz for the given loading conditions of ten milliseconds and twenty MIPs. In other words, the CPU frequency of 40 MHz of FIG. 5C was found to conserve power at a maximum compared to all other CPU frequencies which were applied to the CPU 402 during the off-line testing.

Similarly, in FIG. 5D, the workload for the CPU 402 was held at a constant value of twenty milliseconds while the CPU utilization was held at a constant value of twenty MIPs. The frequency for the CPU 402 was determined empirically and was discovered to be an optimal 80 MHz for the given loading conditions of twenty milliseconds and twenty MIPs. In other words, the CPU frequency of 80 MHz in FIG. 5D was found to conserve power at a maximum compared to all other CPU frequencies which were applied to the CPU 402 during the off-line testing.

In decision block 720, it is determined if an adequate number of iterations have been completed to create a meaningful hypersurface 504. This decision may be assessed by an automated computer-implemented process which determines whether the intervals along each access are adequate in number to provide meaningful data for a workload of a PCD 100 as understood by one of ordinary skill in the art.

If the inquiry to decision block 720 is negative, then the "No" branch is followed to block 725 in which the next value along the first axis is selected and maintained as a constant. The process then proceeds back to block 710.

If the inquiry to decision block 720 is positive, then the "Yes" branch is followed to Block 730 in which the lines formed from the iterations completed by blocks 705-725 are joined together to form a hypersurface 555A as illustrated in FIGS. 5A-5B and FIG. 5F. The process then returns to step 620 of FIG. 6.

Figure 8A:
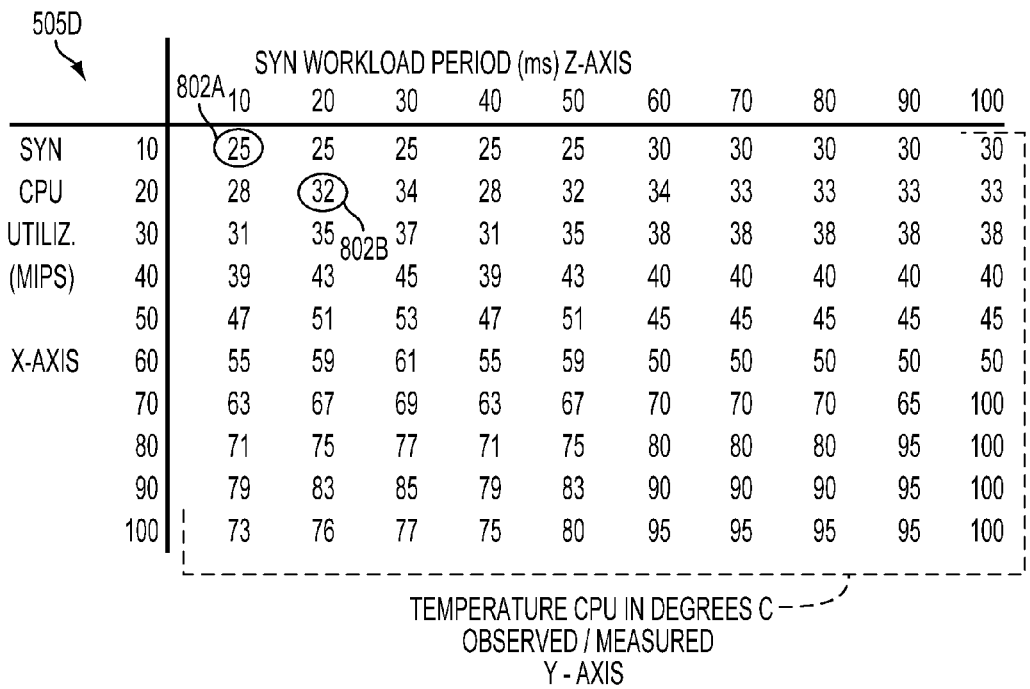
FIG. 8A is a chart providing observed temperature values of a CPU for the y-axis of a hypersurface of FIG. 8B that correspond with synthetic workloads plotted along the z-axis and x-axis.
Figure 8B:
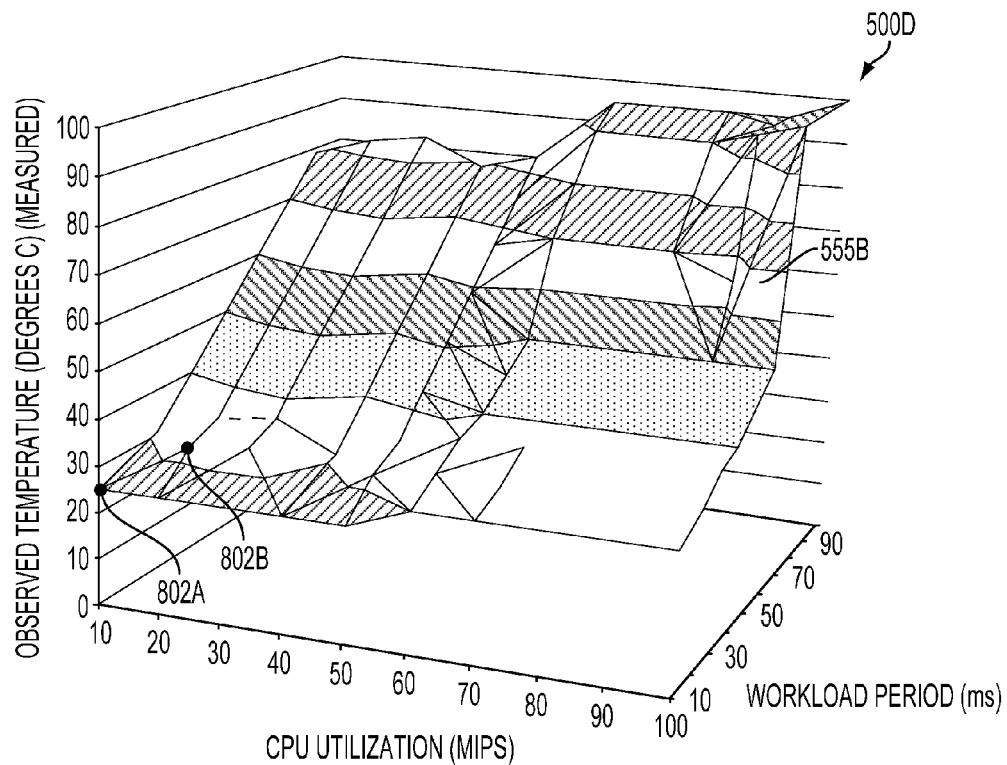
FIG. 8B is a graph illustrating a three-dimensional plot of a hypersurface which corresponds with the chart of values illustrated in FIG. 8A.

FIG. 8A is a chart 505D providing observed temperature values of a CPU 402 for the y-axis of a hypersurface 555B of FIG. 8B that correspond with synthetic workloads plotted along the z-axis and x-axis. This chart 505D is very similar to the chart 505C illustrated in FIG. 5E. As noted previously, an axis of an N-dimensional space, such as the y-axis of a three-dimensional space, may also represent an unknown or variable that may impact power consumption as well as performance of a PCD 100 and which is simply observed as a result of the loading conditions provided by the other axes which represent variables that may be held as constants to provide the loading conditions. Typically, these types of parameters cannot be controlled or varied by a PCD 100 operated in a normal manner. Such parameter types may be referred to as non-controllable parameters as noted above. The non-controllable parameter illustrated in FIG. 8A and FIG. 8D which is represented by the y-axis is temperature expressed in degrees Celsius.

In this fourth chart 505D, the top row of the chart 505D corresponds to values plotted along the z-axis while the first column on the far left of the chart 505D corresponds to values plotted along the x-axis. Similar to the third chart 505C, the z-axis may represent a workload period for the CPU 402 expressed in milliseconds while the x-axis may represent utilization for the CPU 402 expressed in MIPs.

This means that for a first point 802A which may be plotted in the graph 500D of FIG. 8B, the coordinates for this first point 802A are as follows: an x-coordinate of ten MIPs, a y-coordinate of 25 degrees Celsius, and a z-coordinate of ten milliseconds. One of ordinary skill the art recognizes that the x-coordinate and z-coordinate were applied to the CPU 402, while the temperature of the CPU 402 corresponding to the y-coordinate was merely observed.

Similarly, this means that for a second point 802B which may be plotted in the graph 500D of FIG. 8B, the coordinates for this second point 802B are as follows: an x-coordinate of twenty MIPs, a y-coordinate of 32 degrees Celsius, and a z-coordinate of twenty milliseconds. One of ordinary skill the art recognizes that the x-coordinate and z-coordinate were applied to the CPU 402, while the temperature of 25 degrees Celsius for the CPU 402 (corresponding to the y-coordinate) was merely observed.

FIG. 8B is a graph 500D illustrating a three-dimensional plot of a hypersurface 555B which corresponds with the chart 505D of values illustrated in FIG. 8A. The y-axis of this three-dimensional space of FIG. 8B represents an unknown or variable that may impact power consumption as well as performance of the PCD 100 and which is simply observed as a result of the loading conditions provided by the other axes which represent variables that may be held as constants to provide the loading conditions. FIG. 8B includes two points 802A, 802B which were selected from the fourth chart 505D of FIG. 8A. This hypersurface 555B of FIG. 8B was produced by routine 615 illustrated in FIG. 7. The unknowns or variables represented on the y-axis that may impact power consumption of a PCD 100 and performance and which may be simply observed as a result of loading conditions include, but are not limited to, temperature, network bandwidth, volume of streaming data, and wireless signal strength.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter", "then", "next", etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example.

Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the FIGs. which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Although selected aspects have been illustrated and described in detail, it will be understood that various substitutions and alterations may be made therein without departing from the spirit and scope of the present invention, as defined by the following claims.

What is claimed is:

1. A method for conserving power in a portable computing device (PCD) comprising:
    while the PCD is in an off-line state:
        identifying at least one controllable parameter of the PCD that influences power consumption of the PCD;
        applying two or more synthetic workloads at various combinations of values to the PCD to simulate various operating conditions of the PCD;
        for each combination of values for the two or more synthetic workloads, determining a corresponding value for the controllable parameter that optimizes power conservation of the PCD under the applied two or more synthetic workloads;
        creating a hypersurface based on the various combination of values for the applied two or more synthetic workloads and the corresponding value for the controllable parameter that optimizes power conservation of the PCD under the applied two or more synthetic workloads;
    placing the PCD into a normal operating state;
    while the PCD is in the normal operating state:
        applying two or more actual workloads to the PCD corresponding to the two or more synthetic workloads applied to the PCD while the PCD is in the off-line state;
        determining using a workload predictor predicted workloads based on the two or more actual workloads applied to the PCD;
        comparing the predicted workloads to the combinations of values of the two or more synthetic workloads in the hyperspace to select one of the corresponding values for the controllable parameter; and
        adjusting parameters of the workload predictor based on the selected value for the controllable parameter from the hypersurface.

2. The method of claim 1, wherein the synthetic workloads comprise one of a CPU utilization expressed in millions of instructions per second (MIPs), a period of a CPU expressed in milliseconds, percent of utilization of a CPU, distribution of off-periods or idle times for a CPU, frequency of interrupts for a CPU, interrupt separation, and length of sleep periods for a CPU.

3. The method of claim 1, wherein the at least one controllable parameter of the PCD that influences power consumption of the PCD comprises an operational frequency of a central processing unit of the portable computing device, bus bandwidth, and memory bandwidth.

4. The method of claim 1, further comprising measuring at least one non-controllable parameter of the PCD, wherein the non-controllable parameter of the PCD that is measured comprises a temperature of a CPU of the portable computing device, network bandwidth, volume of streaming data, and wireless signal strength.

5. The method of claim 1, wherein creating a hypersurface based on the various combination of values for the applied two or more synthetic workloads and the corresponding value for the controllable parameter that optimizes power conservation of the PCD under the applied two or more synthetic workloads comprises selecting a plurality of values for one of the two or more synthetic workloads while maintaining the other of the two or more synthetic workloads at a constant value.

6. The method of claim 1, further comprising plotting one or more points from the workload predictor to one or more axes of the hypersurface in a coordinate system.

7. The method of claim 1, wherein the workload predictor comprises an algorithm.

8. The method of claim 7, wherein the algorithm comprises at least one of a dynamic controlled voltage setting (DCVS) algorithm and a dynamic voltage and frequency scaling (DVFS) algorithm.

9. The method of claim 1, further comprising storing the adjusted parameters of the workload predictor in memory.

10. The method of claim 1, wherein the portable computing device comprises at least one of a mobile telephone, a personal digital assistant, a pager, a smartphone, a navigation device, and a hand-held computer with a wireless connection or link.

11. A computer system for conserving power in a portable computing device, the system comprising:
    a processor operable to:
        while the PCD is in an off-line state:
            identify at least one controllable parameter of the PCD that influences power consumption of the PCD;
            apply two or more synthetic workloads at various combinations of values to the PCD to simulate various operating conditions of the PCD;
            for each combination of values for the two or more synthetic workloads, determine a corresponding value for the controllable parameter that optimizes power conservation of the PCD under the applied two or more synthetic workloads;

create a hypersurface based on the various combination of values for the applied two or more synthetic workloads and the corresponding value for the controllable parameter that optimizes power conservation of the PCD under the applied two or more synthetic workloads;

placing the PCD into a normal operating state;

while the PCD is in the normal operating state:

apply two or more actual workloads to the PCD corresponding to the two or more synthetic workloads to the PCD;

determine using a workload predictor predicted workloads based on the two or more actual workloads applied to the PCD;

compare the predicted workloads to the combinations of values of the two or more synthetic workloads in the hyperspace to select one of the corresponding values for the controllable parameter; and adjust parameters of the workload predictor based on the selected value for the controllable parameter from the hypersurface.

12. The system of claim 11, wherein the synthetic workloads comprise one of a CPU utilization expressed in millions of instructions per second (MIPs), a period of a CPU expressed in milliseconds, percent of utilization of a CPU, distribution of off-periods or idle times for a CPU, frequency of interrupts for a CPU, interrupt separation, and length of sleep periods for a CPU.

13. The system of claim 12, wherein the at least one controllable parameter of the PCD that influences power consumption of the PCD comprises an operational frequency of a central processing unit of the portable computing device, bus bandwidth, and memory bandwidth.

14. The system of claim 11, wherein the processor is further operable to measure at least one non-controllable parameter of the PCD, wherein the non-controllable parameter comprises a temperature of a CPU of the portable computing device, network bandwidth, volume of streaming data, and wireless signal strength.

15. The system of claim 11, wherein the processor operable to create the hypersurface comprises selecting a plurality of values for one of the two or more synthetic workloads while maintaining the other of the two or more synthetic workloads at a constant value.

16. The system of claim 11, wherein the processor is further operable to plot one or more points from the workload predictor to one or more axes of the hypersurface.

17. The system of claim 11, wherein the workload predictor comprises an algorithm.

18. The system of claim 17, wherein the algorithm comprises at least one of a dynamic controlled voltage setting (DCVS) algorithm and a dynamic voltage and frequency scaling (DVFS) algorithm.

19. The system of claim 11, wherein the processor is further operable to store the adjusted parameters of the workload predictor in memory.

20. The system of claim 11, wherein the portable computing device comprises at least one of a mobile telephone, a personal digital assistant, a pager, a smartphone, a navigation device, and a hand-held computer with a wireless connection or link.

21. A computer system for conserving power consumption of a wireless handheld computing device, the system comprising:

means for identifying at least one controllable parameter of the PCD that influences power consumption of the PCD;

means for applying two or more synthetic workloads at various combinations of values to the PCD to simulate various operating conditions of the PCD;

means for determining, for each combination of values for the two or more synthetic workloads, a corresponding value for the controllable parameter that optimizes power conservation of the PCD under the applied two or more synthetic workloads;

means for creating a hypersurface based on the various combination of values for the applied two or more synthetic workloads and the corresponding value for the controllable parameter that optimizes power conservation of the PCD under the applied two or more synthetic workloads;

means for applying two or more actual workloads to the PCD corresponding to the two or more synthetic workloads applied to the PCD;

means for determining using a workload predictor predicted workloads based on the two or more actual workloads applied to the PCD;

means for comparing the predicted workloads to the combinations of values of the two or more synthetic workloads in the hyperspace to select one of the corresponding values for the controllable parameter; and means for adjusting parameters of the workload predictor based on one or more values from the hypersurface.

22. The system of claim 21, wherein the synthetic workloads comprise one of a CPU utilization expressed in millions of instructions per second (MIPs), a period of a CPU expressed in milliseconds, percent of utilization of a CPU, distribution of off-periods or idle times for a CPU, frequency of interrupts for a CPU, interrupt separation, and length of sleep periods for a CPU.

23. The system of claim 22, wherein the at least one controllable parameter of the PCD that influences power consumption of the PCD comprises an operational frequency of a central processing unit of the portable computing device, bus bandwidth, and memory bandwidth.

24. The system of claim 21, further comprising means for measuring at least one non-controllable parameter of the PCD, wherein the non-controllable parameter comprises a temperature of a CPU of the portable computing device, network bandwidth, volume of streaming data, and wireless signal strength.

25. The system of claim 21, wherein the means for creating a hypersurface comprises means for selecting a plurality of values for one of the two or more synthetic workloads while maintaining the other of the two or more synthetic workloads at a constant value.

26. The system of claim 21, further comprising means for plotting one or more points from the workload predictor to one or more axes of the hypersurface.

27. The system of claim 21, wherein the workload predictor comprises an algorithm.

28. The system of claim 27, wherein the algorithm comprises at least one of a dynamic controlled voltage setting (DCVS) algorithm and a dynamic voltage and frequency scaling (DVFS) algorithm.

29. The system of claim 21, further comprising means for storing the adjusted parameters of the workload predictor in memory.

30. The system of claim 21, wherein the portable computing device comprises at least one of a mobile telephone, a personal digital assistant, a pager, a smartphone, a navigation device, and a hand-held computer with a wireless connection or link.

31. A computer program product comprising a non-transitory computer-readable medium having a computer readable program code embodied therein, said computer readable program code adapted to be executed to implement a method for conserving power in a portable computing device (PCD), said method comprising:

while the PCD is in an off-line state:
identifying at least one controllable parameter of the PCD that influences power consumption of the PCD;
applying two or more synthetic workloads at various combinations of values to the PCD to simulate various operating conditions of the PCD;
for each combination of values for the two or more synthetic workloads, determining a corresponding value for the controllable parameter that optimizes power conservation of the PCD under the applied two or more synthetic workloads;
creating a hypersurface based on the various combination of values for the applied two or more synthetic workloads and the corresponding value for the controllable parameter that optimizes power conservation of the PCD under the applied two or more synthetic workloads;
placing the PCD into a normal operating state;
while the PCD is in the normal operating state:
applying two or more actual workloads to the PCD corresponding to the two or more synthetic workloads applied to the PCD while PCD is in the off-line state;
determining using a workload predictor predicted workloads based on the two or more actual workloads applied to the PCD;
comparing the predicted workloads to the combinations of values of the two or more synthetic workloads in the hyperspace to select one of the corresponding values for the controllable parameter; and
adjusting parameters of the workload predictor based on the selected value for the controllable parameter from the hypersurface.

32. The computer program product of claim 31, wherein the synthetic workloads comprise one of a CPU utilization expressed in millions of instructions per second (MIPs), a period of a CPU expressed in milliseconds, percent of utilization of a CPU, distribution of off-periods or idle times for a CPU, frequency of interrupts for a CPU, interrupt separation, and length of sleep periods for a CPU.

33. The computer program product of claim 31, wherein the at least one controllable parameter of the PCD comprises an operational frequency of a central processing unit of the portable computing device, bus bandwidth, and memory bandwidth.

34. The computer program product of claim 31, wherein the method further comprises measuring at least one non-controllable parameter of the PCD comprising one or more of a temperature of a CPU of the portable computing device, network bandwidth, volume of streaming data, and wireless signal strength.

35. The computer program product of claim 31, wherein creating a hypersurface based on the various combination of values for the applied two or more synthetic workloads and the corresponding value for the controllable parameter that optimizes power conservation of the PCD under the applied two or more synthetic workloads comprises selecting a plurality of values for one of the two or more synthetic workloads while maintaining the other of the two or more synthetic workloads at a constant value.

36. The computer program product of claim 31, wherein the program code implementing the method further comprises: plotting one or more points from the workload predictor to one or more axes of the hypersurface.

37. The computer program product of claim 31, wherein the workload predictor comprises an algorithm.

38. The computer program product of claim 37, wherein the algorithm comprises at least one of a dynamic controlled voltage setting (DCVS) algorithm and a dynamic voltage and frequency scaling (DVFS) algorithm.

39. The computer program product of claim 31, wherein the program code implementing the method further comprises: storing the adjusted parameters of the workload predictor in memory.

40. The computer program product of claim 31, wherein the portable computing device comprises at least one of a mobile telephone, a personal digital assistant, a pager, a smartphone, a navigation device, and a hand-held computer with a wireless connection or link.

* * * * *